US012625496B2

(12) United States Patent
Ha et al.

(10) Patent No.: US 12,625,496 B2
(45) Date of Patent: May 12, 2026

(54) MOBILE ROBOT FOR TRANSPORTING ARTICLE IN MANUFACTURING FACILITY AND ARTICLE TRANSPORT SYSTEM INCLUDING SAME

(71) Applicant: SEMES CO., LTD., Cheonan-si (KR)

(72) Inventors: Seung Seok Ha, Seoul (KR); In Sung Choi, Hwaseong-si (KR); Seung Jun Lee, Hwaseong-si (KR)

(73) Assignee: SEMES CO., LTD., Cheonan-si (KR)

( * ) Notice: Subject to any disclaimer, the term of this patent is extended or adjusted under 35 U.S.C. 154(b) by 294 days.

(21) Appl. No.: 18/085,301

(22) Filed: Dec. 20, 2022

(65) Prior Publication Data

US 2023/0195126 A1    Jun. 22, 2023

(30) Foreign Application Priority Data

Dec. 21, 2021    (KR) ........................ 10-2021-0183510

(51) Int. Cl.
*G05D 1/00*        (2024.01)
*G06T 7/50*        (2017.01)

(52) U.S. Cl.
CPC ......... *G05D 1/0214* (2013.01); *G05D 1/0238* (2013.01); *G05D 1/0246* (2013.01);
(Continued)

(58) Field of Classification Search
CPC ............. G06T 7/50; G06T 2207/10028; G06T 2207/20024; G06T 2207/30261; G01S 7/4802; G01S 17/89; G01S 17/931; G05D 1/0248; B65G 49/07; B65G 49/063; B25J 11/0095; B25J 5/007; B25J 9/1666;
(Continued)

(56) References Cited

U.S. PATENT DOCUMENTS 11,532,120 B2 * 12/2022 Cai ........................... G06T 7/90
2011/0052043 A1 * 3/2011 Hyung ................. G05D 1/0242
                                                              382/154
(Continued)

FOREIGN PATENT DOCUMENTS

JP          7257257 B2 * 4/2023
KR    10-2018-0061949    6/2018
KR        20230063306    6/2020

OTHER PUBLICATIONS

Office Action from the Korean Intellectual Property Office dated Sep. 19, 2023.

*Primary Examiner* — Tiffany P Young
*Assistant Examiner* — Ashleigh Nicole Turnbaugh

(57) ABSTRACT

A method of operating a mobile robot for transporting an article in a manufacturing facility, the mobile robot, and an article transport system including the same are proposed. The method of operating the mobile robot includes obtaining a 3-D depth image, extracting, from the 3-D depth image, a region of interest corresponding to a traveling path of the mobile robot on a bottom surface of the manufacturing facility, generating a projected point cloud by projecting an object detected from the region of interest on a reference plane corresponding to the bottom surface, generating an imaginary point cloud filled with voxels in the reference plane, detecting a hole existing in the bottom surface by comparing the imaginary point cloud to the projected point cloud, and travelling while avoiding the hole.

6 Claims, 25 Drawing Sheets

(52) U.S. Cl.
     CPC ...... *G06T 7/50* (2017.01); *G06T 2207/10028*
          (2013.01); *G06T 2207/20024* (2013.01); *G06T*
                                        *2207/30261* (2013.01)

(58) Field of Classification Search
     CPC ........ B25J 9/1684; B25J 13/08; B25J 19/023;
                                        H01L 21/677
     USPC .......................................................... 701/26
     See application file for complete search history.

(56)                     References Cited

U.S. PATENT DOCUMENTS

| 2017/0220876 | A1* | 8/2017 | Gao ........................ G06V 10/82 |
| 2019/0163958 | A1* | 5/2019 | Li .......................... G01S 17/931 |
| 2021/0097311 | A1* | 4/2021 | McBeth ........... G08G 1/096775 |
| 2021/0181347 | A1 | 6/2021 | Shin et al. |
| 2021/0199807 | A1 | 7/2021 | Shin et al. |
| 2021/0370832 | A1* | 12/2021 | Huang ................... G01S 17/89 |
| 2023/0063306 | A1 | 3/2023 | Blondel et al. |

* cited by examiner

```
          ┌──────────────────────┐
          │ System controller (5)│
          └──────────┬───────────┘
                     ↕
     ┌───────────────┼───────────────┐
     ↓               ↓               ↓
┌─────────────┐ ┌─────────────┐   ┌─────────────┐
│Mobile robot │ │Mobile robot │···│Mobile robot │
│    (10)     │ │    (10)     │   │    (10)     │
└─────────────┘ └─────────────┘   └─────────────┘
```

FIG. 23

```
                        ( Start )
                            │
                            ▼
        ┌───────────────────────────────────┐
        │      Obtaining 3-D depth image     │ ∼S2310
        └───────────────────────────────────┘
                            │
              ┌─────────────┴─────────────┐
              ▼                           ▼
   ┌────────────────────┐      ┌────────────────────┐
S2320∼│ Detecting obstacle │      │   Detecting hole   │∼S2325
   └────────────────────┘      └────────────────────┘
              │                           │
              └─────────────┬─────────────┘
                            ▼
                        ( End )
```

1

MOBILE ROBOT FOR TRANSPORTING ARTICLE IN MANUFACTURING FACILITY AND ARTICLE TRANSPORT SYSTEM INCLUDING SAME

CROSS REFERENCE TO RELATED APPLICATION

The present application claims priority to Korean Patent Application No. 10-2021-0183510, filed Dec. 21, 2021, the entire contents of which is incorporated by reference herein for all purposes.

BACKGROUND OF THE INVENTION

Field of the Invention

The present disclosure relates to a method of operating a mobile robot for transporting an article in a manufacturing facility, the mobile robot, and an article transport system including the mobile robot.

Description of the Related Art

A semiconductor or display manufacturing process is a process of manufacturing a final product by performing several tens to hundreds of processes on a substrate (wafer or glass), and each process may be performed by a manufacturing facility that performs the corresponding process. When a process in a specific manufacturing facility is completed, in order to proceed with a next process, an article (substrate) may be transported to a next manufacturing facility and may be stored in a storage facility for a predetermined period.

An article transport system refers to a system allowing the article to be transported or stored for the manufacturing process as described above, and mainly, may be divided into a transport system for transporting the article and a storage system for storing the article.

In the article transport system, not only an overhead hoist transport (OHT) travelling along a rail installed on a ceiling but also a mobile robot transporting the article while travelling along a bottom surface, such as an anonymous driving vehicle, has been introduced. Since there is a risk of a crash to various obstacles when the mobile robot travels in the internal space of a manufacturing facility, various techniques for avoiding the obstacles by using cameras, radar, or lidar have been introduced.

However, a general obstacle detection technology is focused on a method of detecting an obstacle object located in the surrounding, but in the case of semiconductor manufacturing facility, since there are cases where holes are formed in the bottom surface, a method of detecting and avoiding the hole formed on the bottom surface as well as the obstacle object is required.

SUMMARY OF THE INVENTION

Accordingly, an embodiment of the present disclosure is intended to provide a method of operating a mobile robot capable of detecting a hole formed in a bottom surface of a manufacturing facility, the mobile robot, and an article transport system including the same.

The technical problem of the present disclosure is not limited to the above-mention, and other problems not mentioned will be clearly understood by those skilled in the art from the description below.

According to an embodiment of the present disclosure, a method of operating a mobile robot for transporting an article in a manufacturing facility includes: obtaining a 3-D depth image; extracting, from the 3-D depth image, a region of interest corresponding to a traveling path of the mobile robot on a bottom surface of the manufacturing facility; generating a projected point cloud by projecting an object detected from the region of interest on a reference plane corresponding to the bottom surface; generating an imaginary point cloud filled with voxels in the reference plane; detecting a hole existing in the bottom surface by comparing the imaginary point cloud to the projected point cloud; and travelling while avoiding the hole.

The extracting of the region of interest may include presetting a region corresponding to the traveling path of the mobile robot within a lower bottom detection range based on a reference height in the 3-D depth image, into the region of interest.

The generating of the projected point cloud may include: projecting voxels in the region of interest of the 3-D depth image on the reference plane; and applying a voxel filter with respect to the projected voxels to generate the projected point cloud.

The voxel filter may be a filter configured to reduce the number of voxels located in the reference plane.

When the number of voxels located in a unit area in the reference plane is equal to or greater than a threshold value, the voxel filter may change the voxels located in the unit area into one voxel, and when the number of the voxels located in the unit area in the reference plane is less than the threshold value, the voxel filter may remove the voxels in the unit area.

The generating of the imaginary point cloud may include generating the imaginary point cloud filled with voxels in the unit area of the voxel filter in the reference plane.

The detecting of the hole existing in the bottom surface may include: generating a remaining point cloud by removing voxels overlapping with the projected point cloud from the imaginary point cloud; and detecting, from the reference plane, a region with voxels of the remaining point cloud as a region of the hole.

The traveling while avoiding the hole may include: changing voxels in the region of the hole into an obstacle object in the 3-D depth image by applying reversal with respect to the region with the voxels of the remaining point cloud in the reference plane; and presetting a moving path so that the mobile robot may travel to a target location while avoiding the obstacle object.

A mobile robot for transporting an article in a manufacturing facility may include: a robot main body travelling in an internal space of the manufacturing facility; a depth camera provided in the robot main body; and a processor configured to control travelling of the robot main body, wherein the processor may be configured to obtain a 3-D depth image from the depth camera, to extract a region of interest, which may correspond to a travelling path of the mobile robot on a bottom surface of the manufacturing facility, from the 3-D depth image, to generate a projected point cloud by projecting an object detected from the region of interest on a reference plane corresponding to the bottom surface, to generate an imaginary point cloud filled with voxels in the reference plane, to detect a hole existing on the bottom surface by comparing the imaginary point cloud to the projected point cloud, and to control the robot main body so that the robot main body may travel while avoiding the hole.

The processor may be configured to preset a region corresponding to the travelling path of the mobile robot in a lower bottom detection range of a reference height in the 3-D depth image, into the region of interest.

The processor may be configured to project voxels in the region of interest of the 3-D depth image on the reference plane, and to generate the projected point cloud by applying a voxel filter with respect to the projected voxels.

The voxel filter may be a filter configured to reduce the number of voxels located in the reference plane.

When the number of voxels located in a unit area in the reference plane is equal to or greater than a threshold value, the voxel filter may change the voxels located in the unit area into one voxel, and when the number of the voxels located in the unit area in the reference plane is less than the threshold value, the voxel filter may remove the voxels in the unit area.

The processor may be configured to generate the imaginary point cloud filled with voxels in the unit area of the voxel filter of the reference plane.

The processor may be configured to generate a remaining point cloud by removing voxels overlapping with the projected point cloud from the imaginary point cloud, and to detect, from the reference plane, a region with voxels of the remaining point cloud as a region of the hole.

The processor may be configured to change voxels of the region of the hole into an obstacle object in the 3-D depth image by applying reversal with respect to the region with the voxels of the remaining point cloud in the reference plane, and to preset a moving path of the robot main body so that the robot main body may travel to a target location while avoiding the obstacle object.

An article transport system in a manufacturing facility may include: a system controller configured to transmit an instruction for transporting an article in the manufacturing facility; and a mobile robot configured to transport the article according to the instruction, wherein the mobile robot may include: a robot main body travelling in an internal space of the manufacturing facility; a depth camera provided in the robot main body and configured to generate a 3-D depth image; and a processor configured to control travelling of the robot main body, to detect an obstacle located on a travelling path of the mobile robot from an upper region of interest of the 3-D depth image, and to detect a hole located on a bottom surface of the manufacturing facility from a lower region of interest of the 3-D depth image, wherein the processor may be configured to generate a projected point cloud by projecting an object detected from the lower region of interest to a reference plane corresponding to the bottom surface, to generate an imaginary point cloud filled with voxels in the reference plane, to detect a hole existing on the bottom surface by comparing the imaginary point cloud and the projected point cloud, and to control the robot main body so that the robot main body may travel while avoiding the hole.

The mobile robot may be configured to transmit location information of the hole to the system controller, and the system controller may be configured to store the location information of the hole and transmit the location information of the hole to another mobile robot.

The processor may be configured to project voxels of the lower region of interest of the 3-D depth image, on the reference plane, to generate the projected point cloud by applying a voxel filter with respect to the projected voxels, to generate the imaginary point cloud filled with voxels in the unit area of the voxel filter of the reference plane, to generate a remaining point cloud by removing voxels overlapping with the projected point cloud, from the imaginary point cloud, to detect, from the reference plane, a region with voxels of the remaining point cloud as a region of the hole, to change voxels of the region of the hole into an obstacle object in the 3-D depth image by applying reversal with respect to the region with the voxels of the remaining point cloud in the reference plane, and to preset a moving path of the robot main body so that the robot main body travels to a target location while avoiding the obstacle object.

When the number of voxels located in a unit area in the reference plane is equal to or greater than a threshold value, the voxel filter may change the voxels located in the unit area into one voxel, and when the number of the voxels located in the unit area of the reference plane is less than the threshold value, the voxel filter may remove the voxels in the unit area.

According to the present disclosure, the projected point cloud and the imaginary point cloud are compared to each other from the 3-D depth image so that the hole existing in the bottom surface of the manufacturing facility can be detected.

The effect of the present disclosure is not limited to the abovementioned, and other effects not mentioned will be clearly understood by those skilled in the art from the description below.

BRIEF DESCRIPTION OF THE DRAWINGS

FIGS. 2 and 3 are schematic views of the mobile robot according to the present disclosure.

FIG. 22 is a schematic structure of an article transport system according to the present disclosure.

FIG. 23 is a flowchart of a method of operating the mobile robot to detect an obstacle and a hole in the article transport system according to the present disclosure.

DETAILED DESCRIPTION OF THE INVENTION

Figure 1:
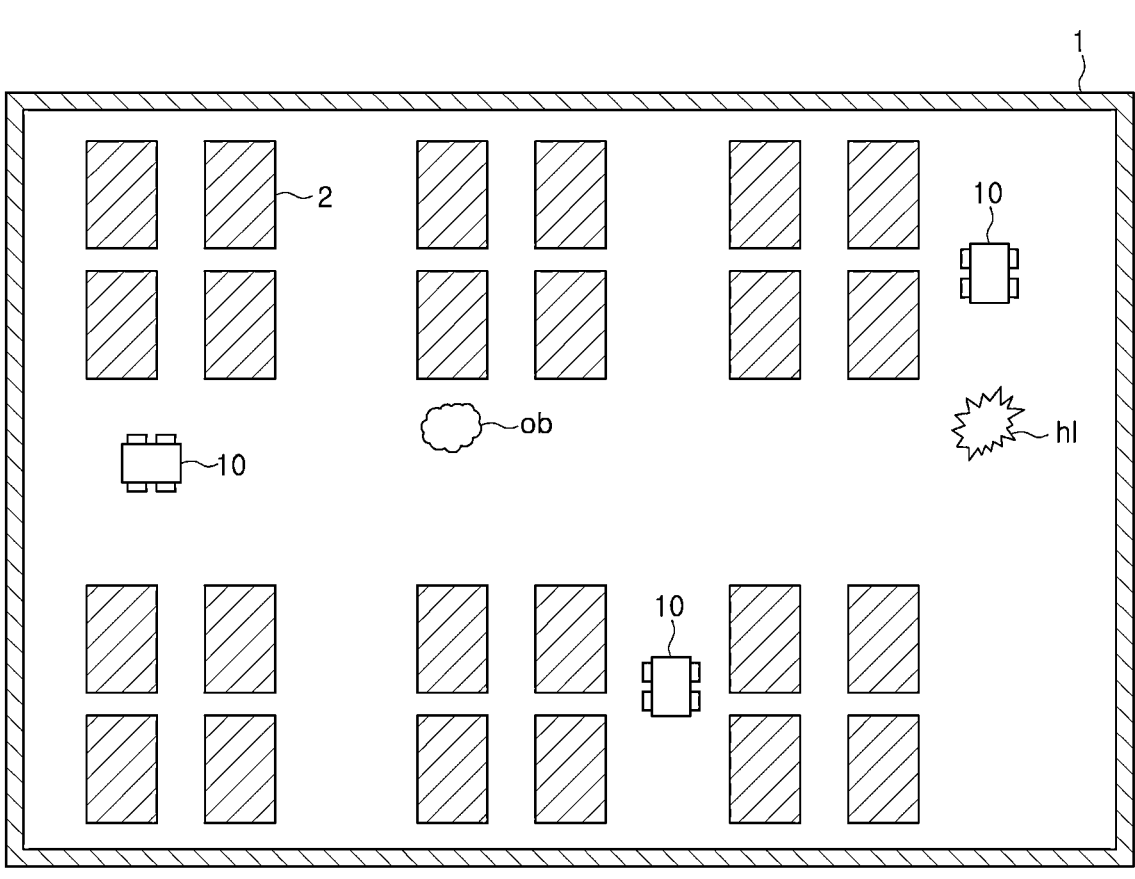
FIG. 1 is a schematic view showing manufacturing equipment in a manufacturing facility and a mobile robot for transporting an article, to which the present disclosure may be applied.
Figure 4:
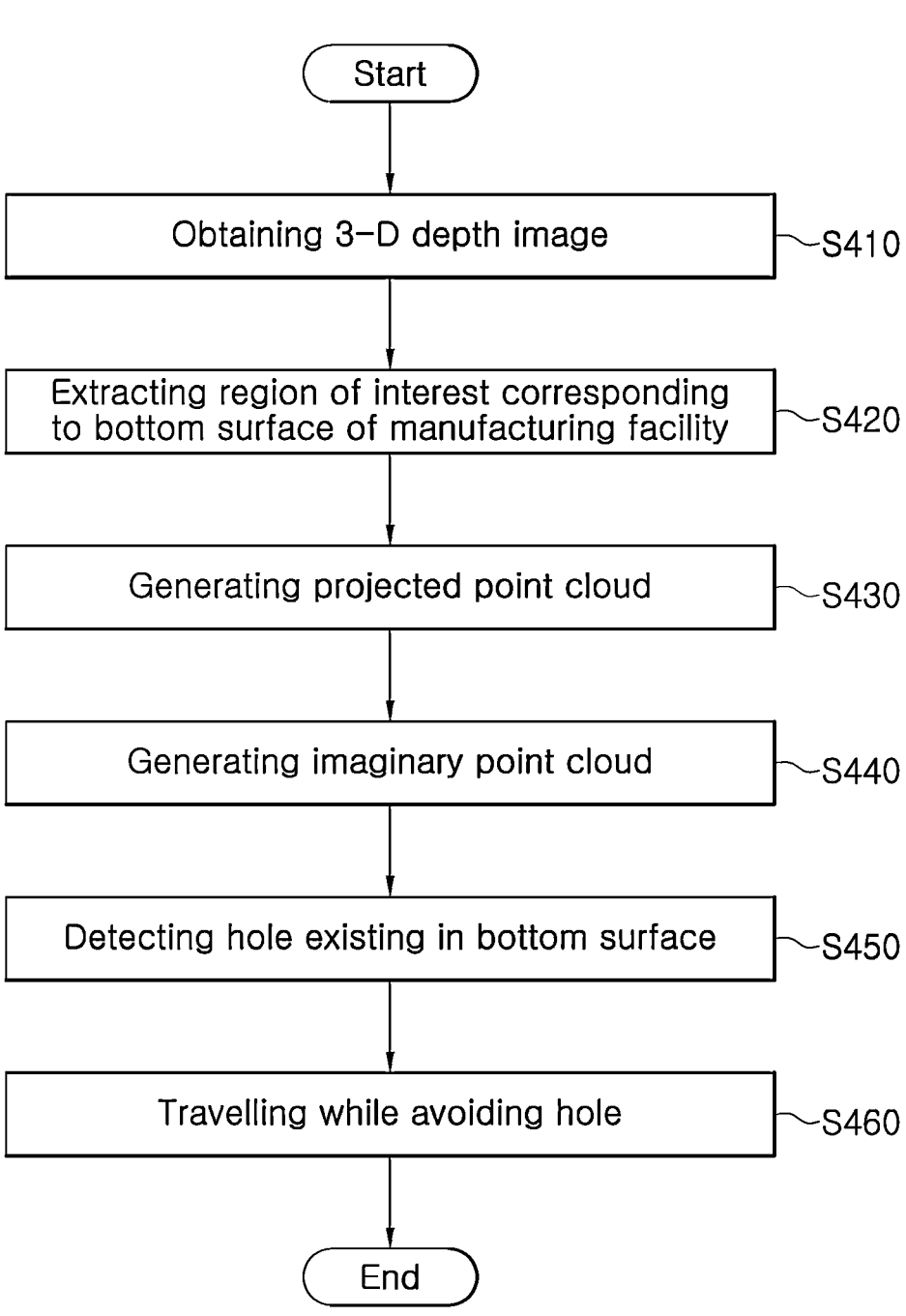
FIGS. 4 to 7 are flowcharts showing a method of operating the mobile robot according to the present disclosure.

Hereinbelow, exemplary embodiments of the present disclosure will be described in detail with reference to the accompanying drawings such that the present disclosure can be easily embodied by one of ordinary skill in the art to which the present disclosure belongs. The present disclosure may be changed to various embodiments and the scope and spirit of the present disclosure are not limited to the embodiments described hereinbelow.

In the following description, if it is decided that the detailed description of known function or configuration related to the present disclosure makes the subject matter of the present disclosure unclear, the detailed description is omitted, and the same reference numerals will be used throughout the drawings to refer to the elements or parts with same or similar function or operation.

Furthermore, in various embodiments, an element with same configuration will be described in a representative embodiment by using the same reference numeral, and different configuration from the representative embodiment will be described in other embodiment.

Other words used to describe the relationship between elements should be interpreted in a like fashion such as "between" versus "directly between", "adjacent" versus "directly adjacent", etc. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, according to the present disclosure, a method of operating a mobile robot for transporting an article in a manufacturing facility, the mobile robot, and an article transport system including the same will be described.

FIG. 1 is a schematic view showing a manufacturing equipment 2 in a manufacturing facility 1 and a mobile robot 10 of transporting an article, to which the present disclosure may be applied.

As shown in FIG. 1, the manufacturing facility 1 is equipped with the manufacturing equipment 2 of performing a manufacturing process, and the mobile robot 10 of transporting the article required in the manufacturing equipment 2 travels in the internal space of the manufacturing facility 1. The manufacturing equipment 2 may be an apparatus capable of performing various processes (e.g., coating, exposure, etching, deposition, cleaning) to a wafer to generate semiconductor products. The wafer may be transferred while being stored in a front opening unified pod (FOUP, F), and the mobile robot 10 receives the FOUP F from specific equipment, and travels to other equipment while storing the FOUP F therein, and deliver the FOUP F to the equipment. Meanwhile, the mobile robot 10 may transfer not only the FOUP F, but also a pod storing an article for exposure therein or various materials.

The mobile robot 10 serves as a vehicle travelling in the internal space of the manufacturing facility, and may travel along a preset path or along an unspecified path. The mobile robot 10 receives an operation instruction from a system controller 5 shown in FIG. 22, and may travel according to the operation instruction. The operation instruction may include a starting point, an arrival point, and article information. The mobile robot 10 may store map information of the manufacturing facility 1 in a memory (not shown) provided therein, and may generate a path for travelling from the starting point to the arrival point from the map information. Hereinbelow, an exemplary structure of the mobile robot 10 will be described.

Figure 2:
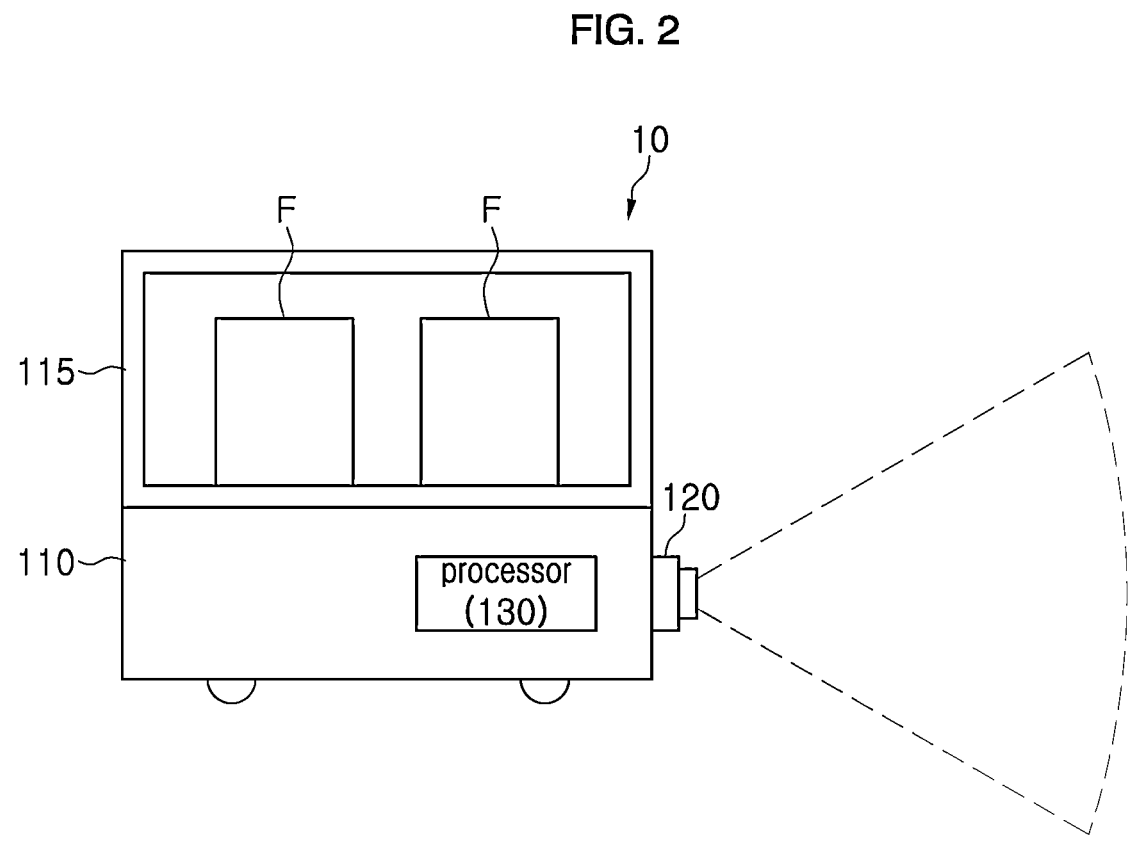
Figure 3:
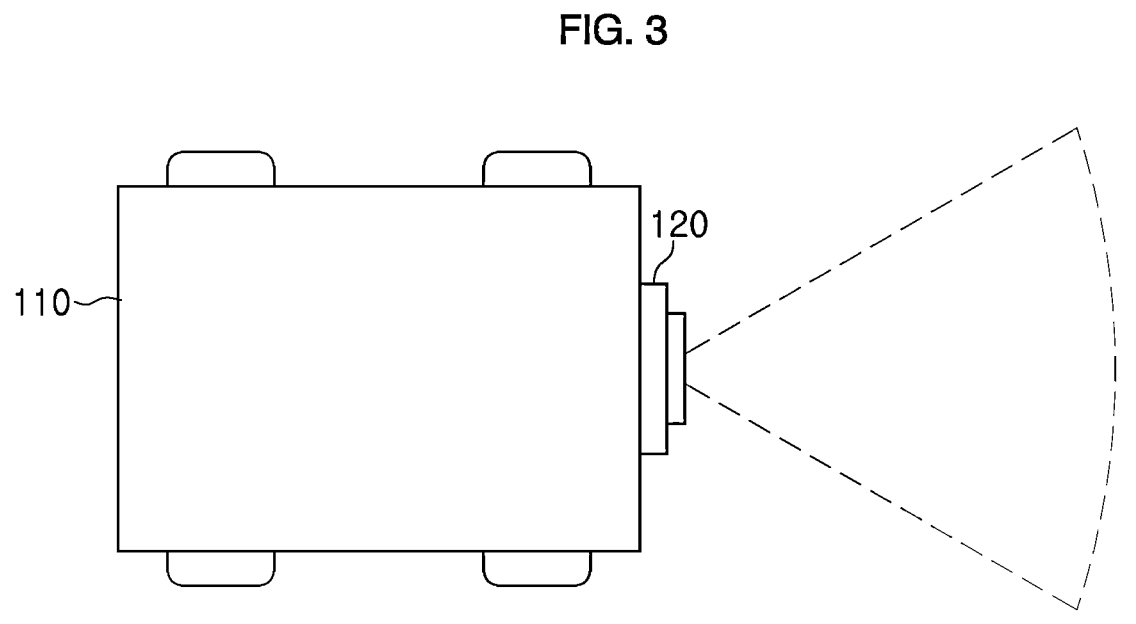

FIGS. 2 and 3 are schematic views of the mobile robot 10 according to the present disclosure. According to the present disclosure, the mobile robot 10 of transporting an article in the manufacturing facility 1 may include a robot main body 110 travelling in the internal space of the manufacturing facility 1, a depth camera 120 provided in the robot main body 110, and a processor 130 controlling travelling of the robot main body 110.

The robot main body 110 is preset to travel along a constant path to transport the article in the manufacturing facility 1. The robot main body 110 may include various driving apparatus for driving such as acceleration, braking, deceleration, steering, etc. Furthermore, a sensor and a camera may be arranged at an external portion of the robot main body 110 or in the internal space to obtain information necessary for travelling of the robot main body 110.

Meanwhile, as shown in FIG. 2, in the mobile robot 10, a storage part 115 may be provided at an upper portion of the robot main body 110 to store the article therein. A storage region may be provided in the storage part 115 to store the article (e.g., FOUP F).

The depth camera 120 may capture the surroundings of the robot main body 110 to generate a 3-D depth image, and may provide the 3-D depth image to the processor 130. The depth camera 120 may be provided at the external portion of the robot main body 110, and particular, may be provided at a front portion so as to determine a location of the robot main body 110 or an obstacle located on the travelling path. A plurality of depth cameras 120 may be provided, for example, one depth camera may be provided at each of the front portion and a rear portion of the robot main body 110, and a plurality of depth cameras may be provided at the front portion and capture different directed images (left image, right image, etc.). The 3-D depth image consists of a plurality of voxels provided in a 3-D space, and each of the voxels is defined by coordinates of x, y, and z.

The processor 130 may perform a calculation process for traveling of the robot main body 110, and may control the driving apparatus of the robot main body 110. Mainly, the processor 130 may consist of a plurality of processing units (CPU and GPU) for the calculation process and a controller to control the driving apparatus. Specifically, the processor 130 may detect not only an obstacle but also a hole existing in the bottom surface, from the 3-D depth image captured by the depth camera 120, and may control the robot main body 110 so that the robot main body may travel while avoiding the obstacle and the hole. Herein below, the method of operating the mobile robot 10 capable of detecting the hole formed in the bottom surface of the manufacturing facility 1 will be described, and the operation method described below will be performed by the processor 130.

FIGS. 4 to 7 are flowcharts showing the method of operating the mobile robot 10 according to the present disclosure.

According to the present disclosure, the method of operating the mobile robot 10 includes obtaining the 3-D depth image IMG1 at S410, extracting, from the 3-D depth image IMG1, an region of interest ROI corresponding to the travelling path of the mobile robot 10 on the bottom surface of the manufacturing facility 1 at S420, generating a projected point cloud PC2 by projecting an object detected from the region of interest ROI on a reference plane RP corresponding to the bottom surface at S430, generating an imaginary point cloud PC3 filled with voxels in the reference plane RP at S440, detecting a hole hl existing on the bottom surface by comparing the imaginary point cloud PC3 and the projected point cloud PC2 to each other at S450, and travelling, by the mobile robot, while avoiding the hole hl at S460.

Figure 8:
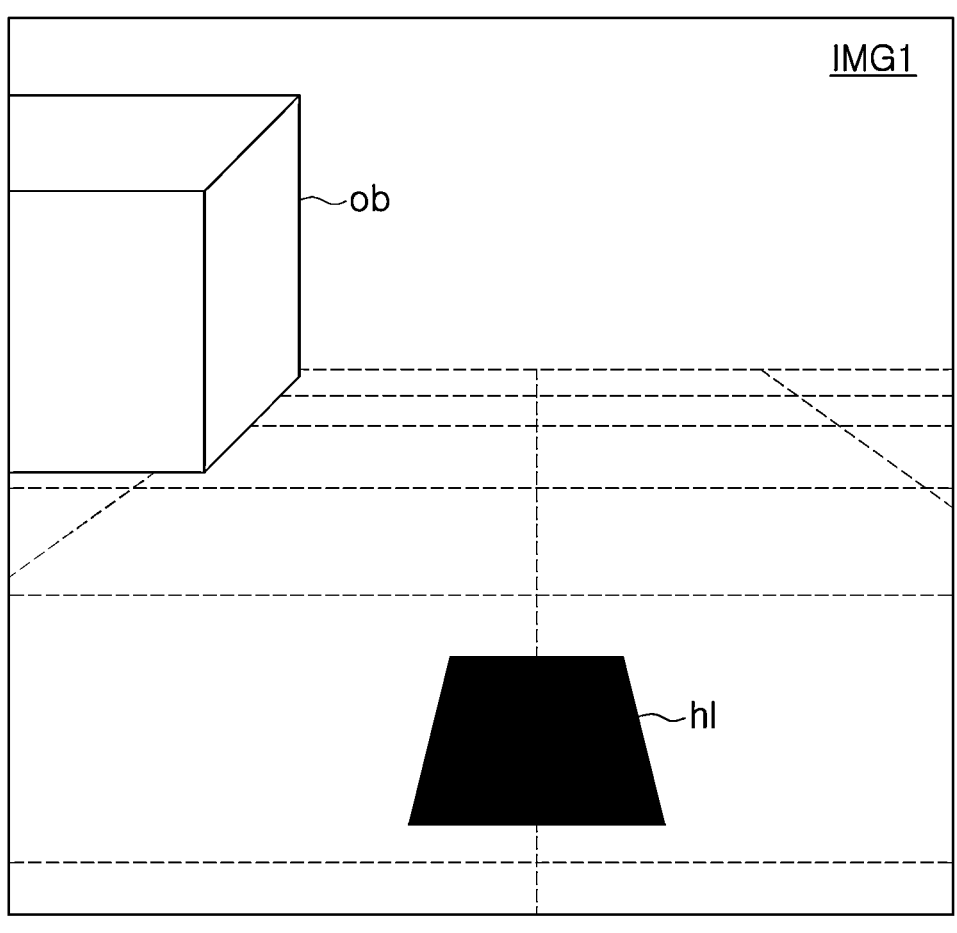
FIGS. 8 to 21 are exemplary views showing a process of detecting a hole existing in a bottom surface from a 3-D depth image according to an embodiment of the present disclosure.

In the obtaining at S410 of the 3-D depth image IMG1, an image is obtained as shown in FIG. 8, and a general obstacle ob is easily detected, but in the case of the hole hl formed on the bottom surface, since there is no voxel value corresponding to the hole, it is difficult to recognize the hole hl as an obstacle. The embodiment of the present disclosure provides the method for recognizing the hole hl formed on the bottom surface as one obstacle, and allowing the mobile robot 10 to travel while avoiding the hole hl.

Figure 9:
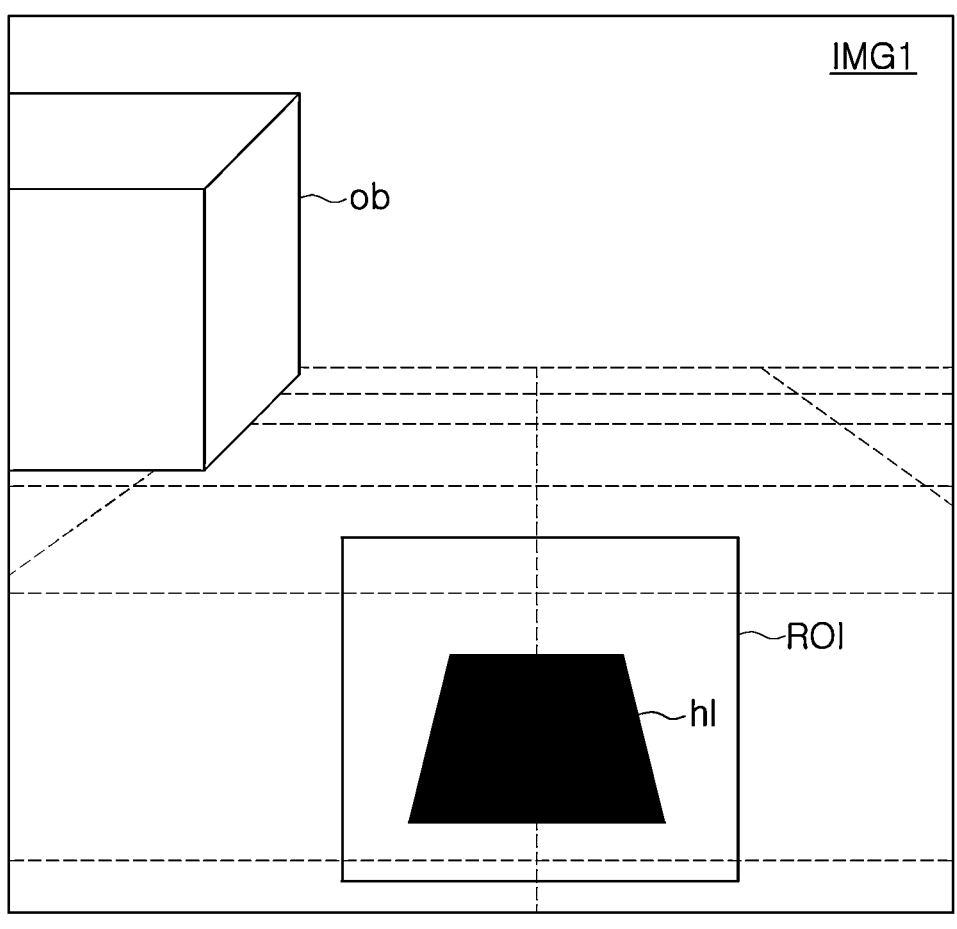
Figure 10:
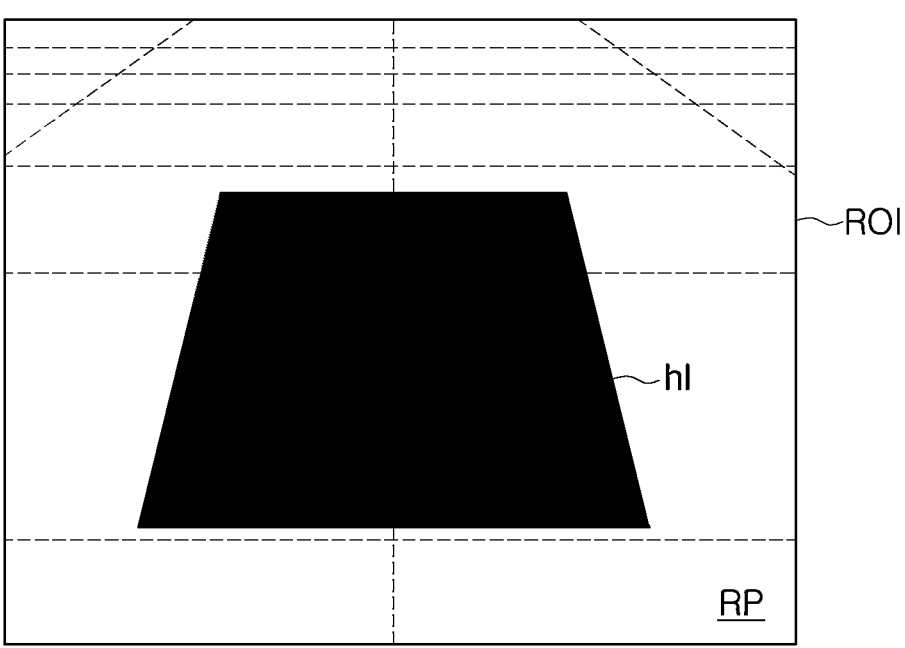

According to the embodiment of the present disclosure, the extracting at S420 of the region of interest ROI may include presetting a region corresponding to the travelling path of the mobile robot 10 within a lower bottom detection range based on a reference height in the 3-D depth image IMG1, into the region of interest ROI corresponding to the bottom surface of the manufacturing facility. For example, the reference height may be preset as a height at which the depth camera 120 is installed. FIG. 9 shows the case in which the region corresponding to the travelling path of the mobile robot 10 within the lower bottom detection range is preset into the region of interest ROI. As shown in FIG. 10, the 3-D depth image with respect to the region of interest ROI may be extracted. In FIG. 10, there are no voxels in the empty region like the hole hl.

Figure 5:
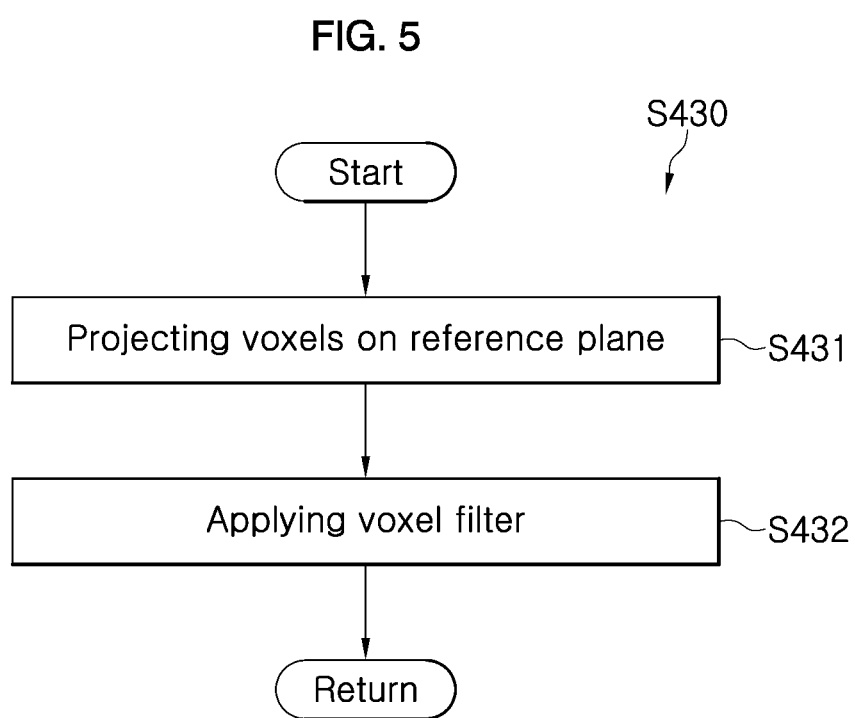
Figure 6:
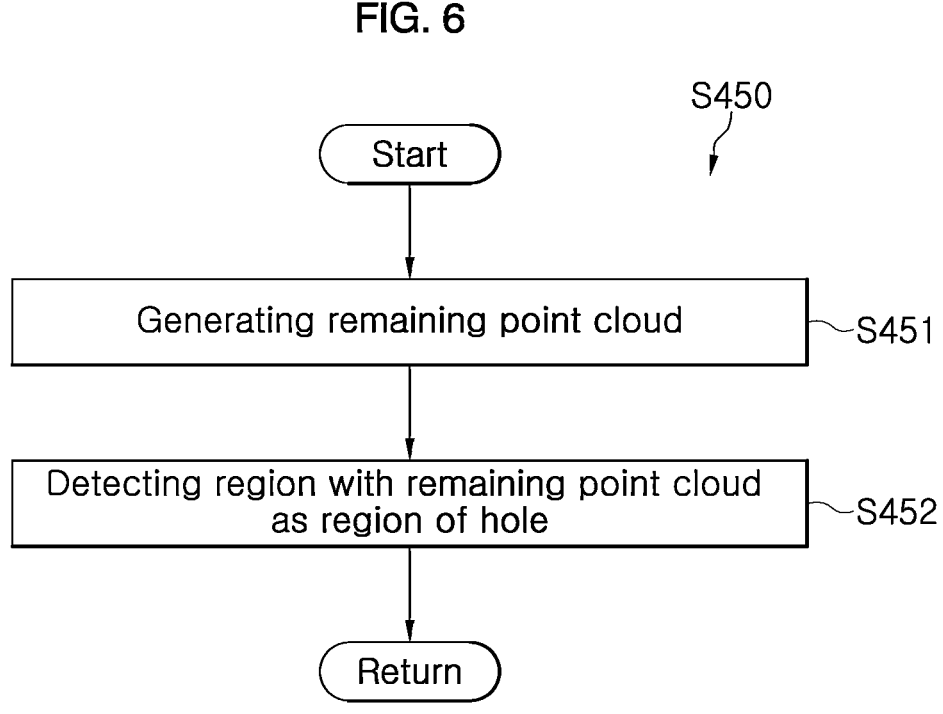
Figure 7:
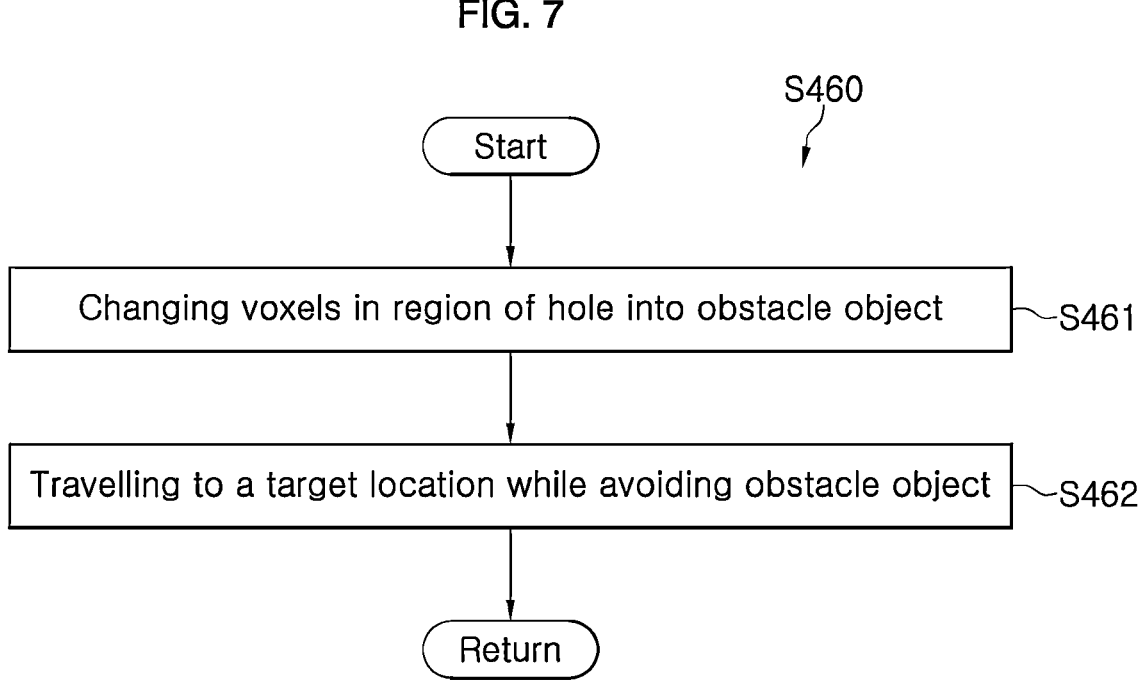

According to the embodiment of the present disclosure, as shown in FIG. 5, the generating at S440 of the projected point cloud PC2 may include projecting voxels of the region of interest ROI of the 3-D depth image IMG1 on the reference plane RP at S441, and generating the projected point cloud PC2 by applying a voxel filter X with respect to the projected voxels vx1 at S442.

Figure 11:
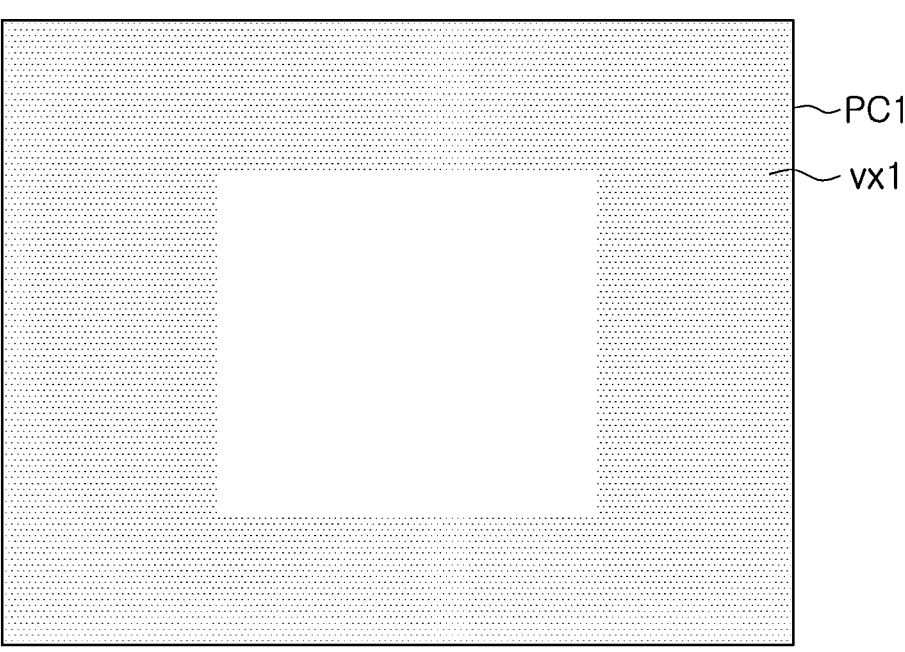

In the projecting at S441 of the voxels of the region of interest ROI on the reference plane RP, the 3-D depth image in FIG. 10 may be changed into a point cloud PC1 of a 2-D planar image as shown in FIG. 11. Here, since there are no voxels in a region of the hole hl, an empty region exists.

In order to quickly perform a calculation process with respect to the point cloud PC1 of FIG. 11, the voxel filter X may be applied.

Figure 12:
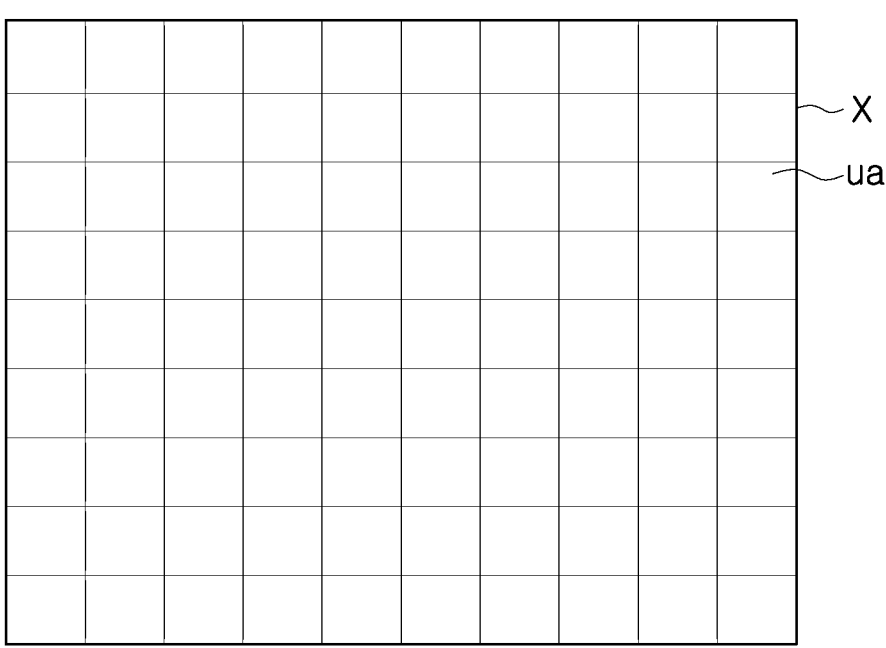
Figure 13:
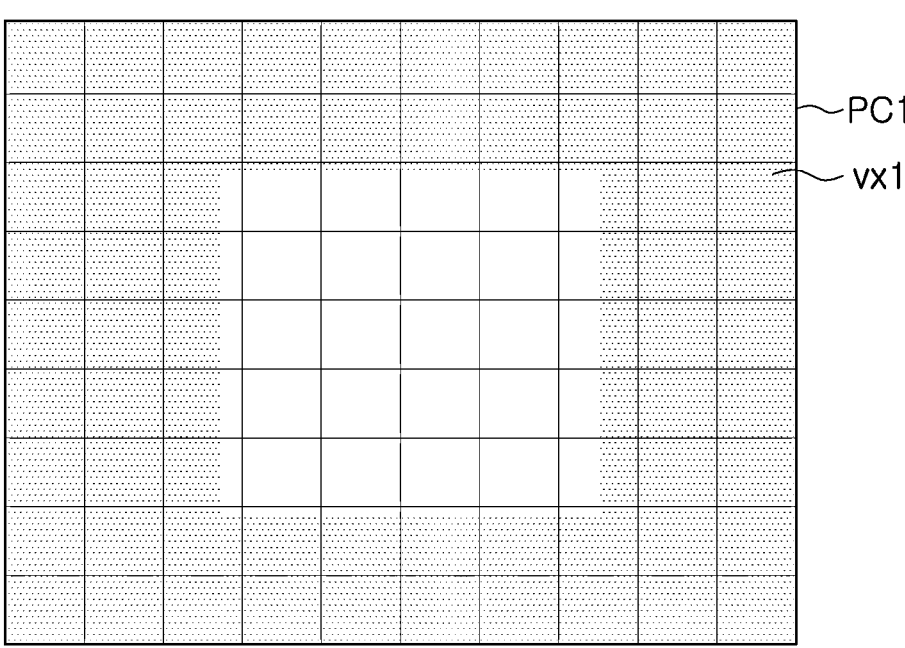
Figure 14:
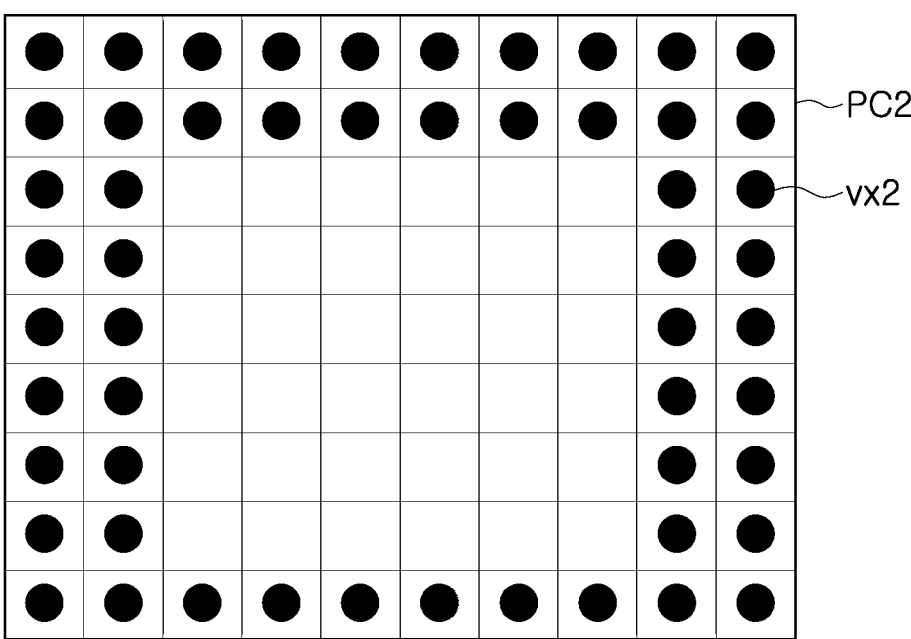

According to the embodiment of the present disclosure, the voxel filter X may be a filter configured to reduce the number of voxels vx1 located in the reference plane RP. The voxel filter X is configured, when the number of voxels located at a unit area ua in the reference plane RP is equal to or greater than the threshold value, to change the voxels located at the unit area ua into one voxel vx2, and when the number located at the unit area ua in the reference plane RP is less than a threshold value, to remove the voxels vx1 of the unit area ua. For example, the voxel filter X may have the configuration as shown in FIG. 12, and the size (width and height) of the voxel filter X is equal to the size of the region of interest ROI. As shown in FIG. 13, when the voxel filter X is applied to the point cloud PC1, the number of voxels for each unit area ua is counted. When the number of voxels in a specific unit area ua is equal to or greater than the threshold value, the voxels vx1 of the unit area ua are changed into one voxel vx2 as shown in FIG. 14. When the number of voxels in the specific unit area ua is less than the threshold value, as shown in FIG. 14, the voxels vx1 of the unit area ua are removed and the unit area ua empties.

Therefore, as shown in FIG. 14, the projected point cloud PC2 is generated in the reference plane RP, and the projected point cloud PC2 includes simplified voxels vx2.

As the voxel filter X is applied to the point cloud PC1 as described above, the amount of data and computing resources required for detection of the hole are reduced and quick data processing is possible.

Figure 15:
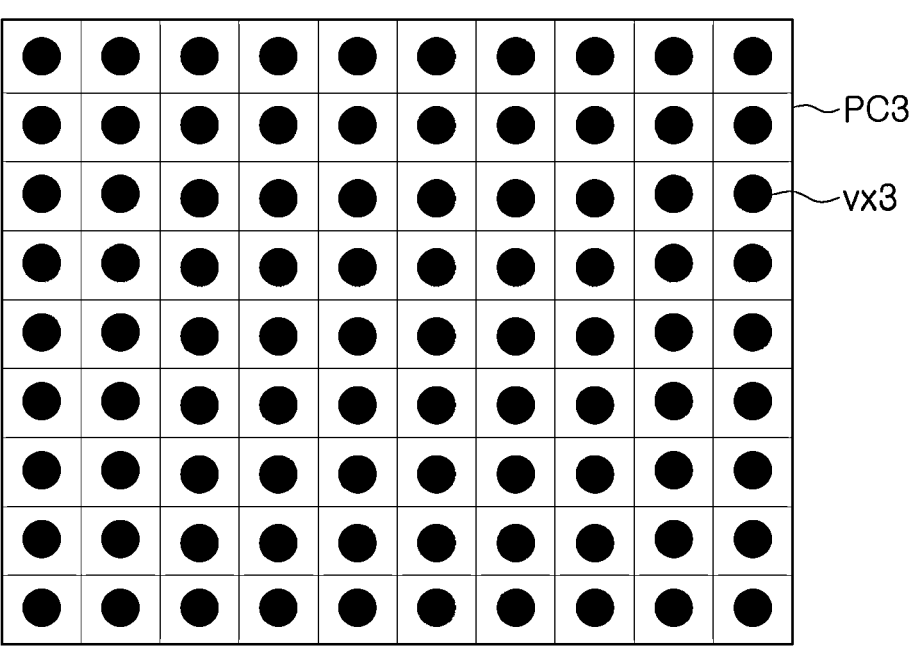

According to the embodiment of the present disclosure, the generating at S440 of the imaginary point cloud PC3 includes generating the imaginary point cloud PC3 filled with voxels vx3 in the unit area ua of the voxel filter X in the reference plane RP. As shown in FIG. 15, the imaginary point cloud PC3 having the size equal to the size of the region of interest ROI and with the voxels vx3 filled in each unit area ua of the voxel filter X. The generating of the imaginary point cloud PC3 is performed by dividing a region of the hole from the region of interest ROI.

According to the embodiment of the present disclosure, the detecting at S450 of the hole hl existing on the bottom surface may include generating a remaining point cloud PC4 by removing voxels overlapping with the projected point cloud PC2, from the imaginary point cloud PC3, at S451, and detecting a region in which voxels of the remaining point cloud PC4 exist from the reference plane RP is detected as the region of the hole at S452.

Figure 16:
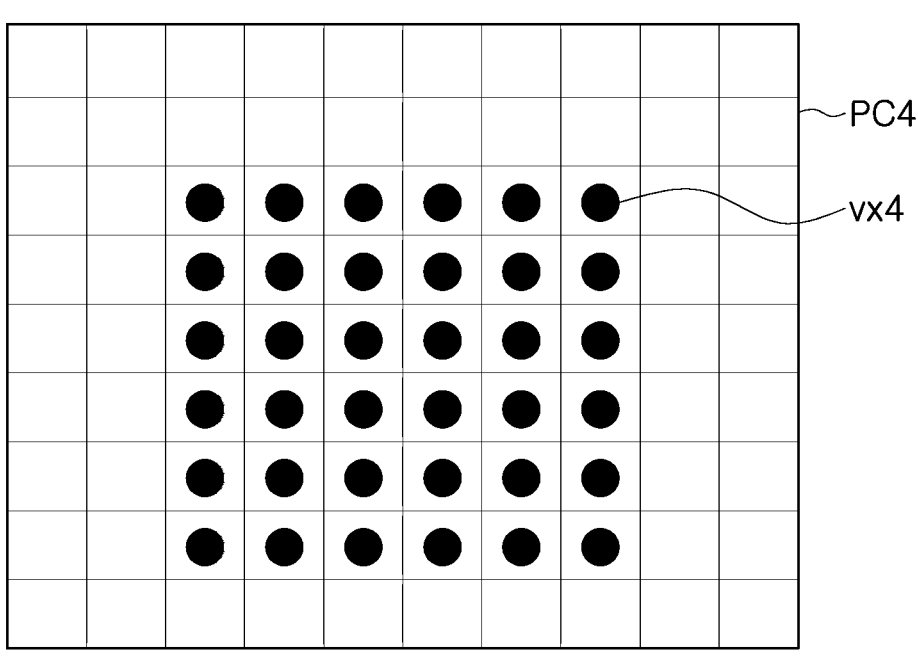

As shown in FIG. 16, the remaining point cloud PC4 is generated by removing voxels overlapping with the projected point cloud PC2 from the imaginary point cloud PC3, and the remaining point cloud PC4 includes remaining voxels vx4 that does not overlap with the projected point cloud PC2 in the imaginary point cloud PC3. A region in which the voxels vx4 exist may be detected as the region of the hole.

According to the embodiment of the present disclosure, the travelling at S460 of the mobile robot while avoiding the hole may include changing, at S461, voxels of the region of the hole into an obstacle object ob_hl in the 3-D depth image IMG1 by applying reversal with respect to the region with the voxels vx4 of the remaining point cloud PC4 in the reference plane RP, and presetting, S462, a moving path so that the robot main body travels to a target location while avoiding the obstacle object ob_hl.

Figure 17:
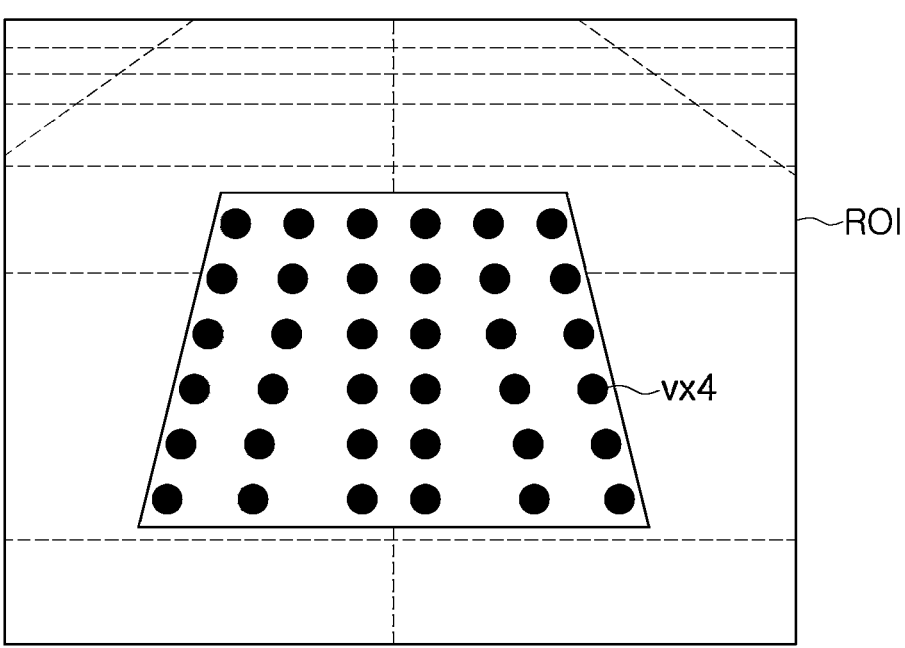
Figure 18:
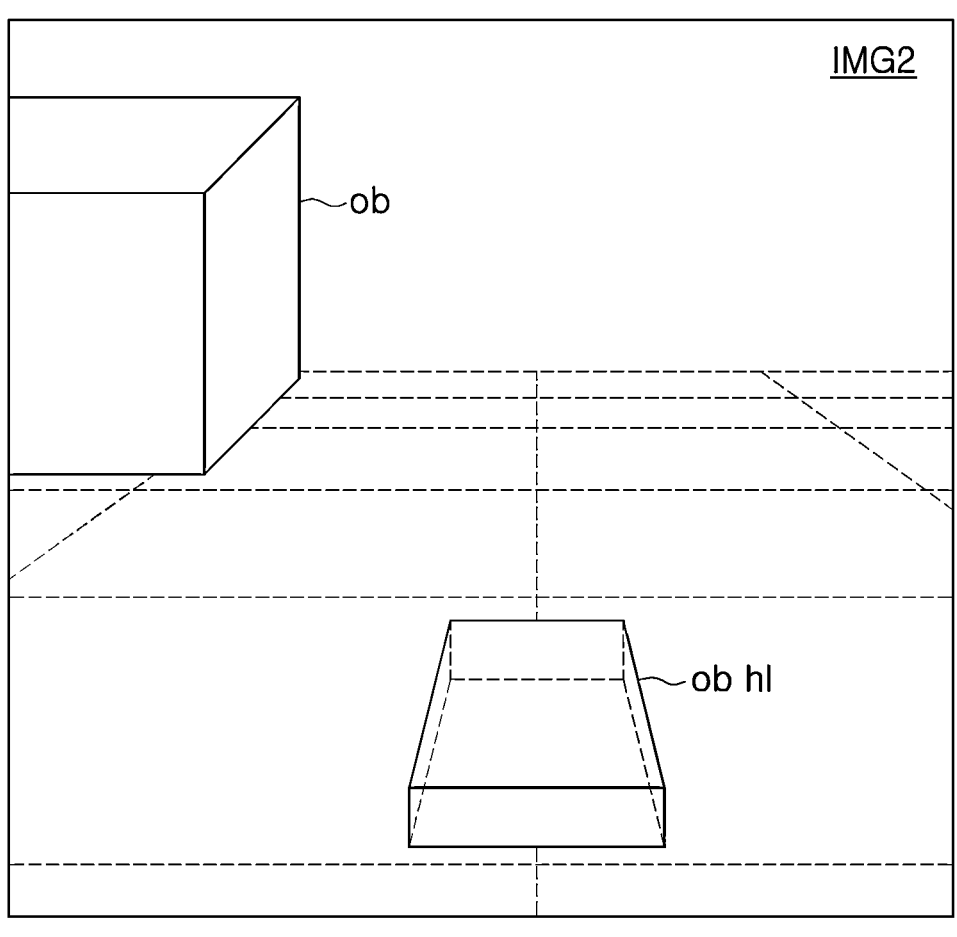

As shown in FIG. 17, the 3-D point cloud filled with the voxels vx4 is generated in the region of the hole by applying reversal with respect to the remaining point cloud PC4 in FIG. 1, and the voxels vx4 in the region of the hole are changed into the obstacle object ob_hl, thereby generating a 3-D depth image IMG2 changed as shown in FIG. 18. The mobile robot 10 can travel while avoiding the obstacle object ob_hl of the changed 3-D depth image IMG2. Eventually, even when the hole is formed in the bottom surface, the mobile robot 10 can recognize the hole as an obstacle and avoid same.

Figure 19:
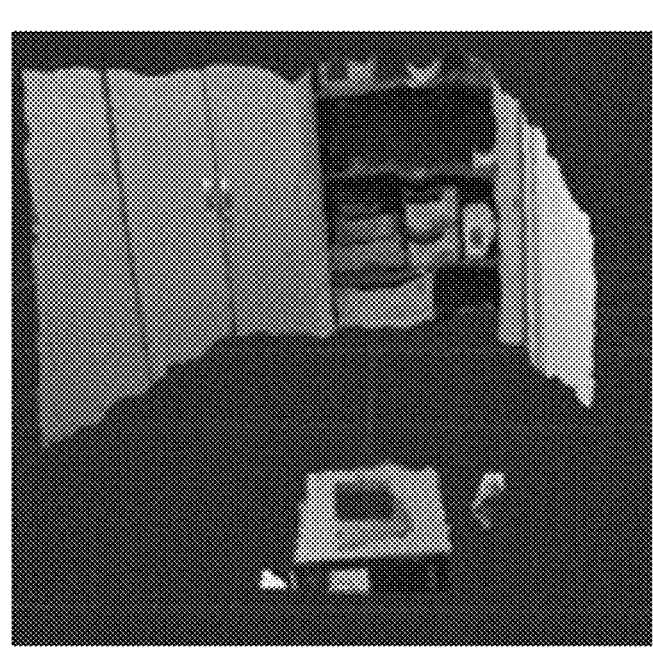
Figure 20:
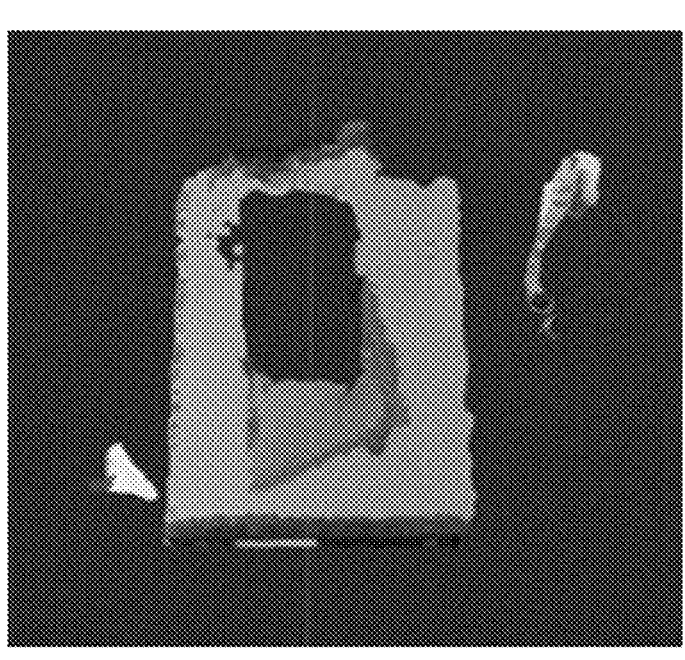
Figure 21:
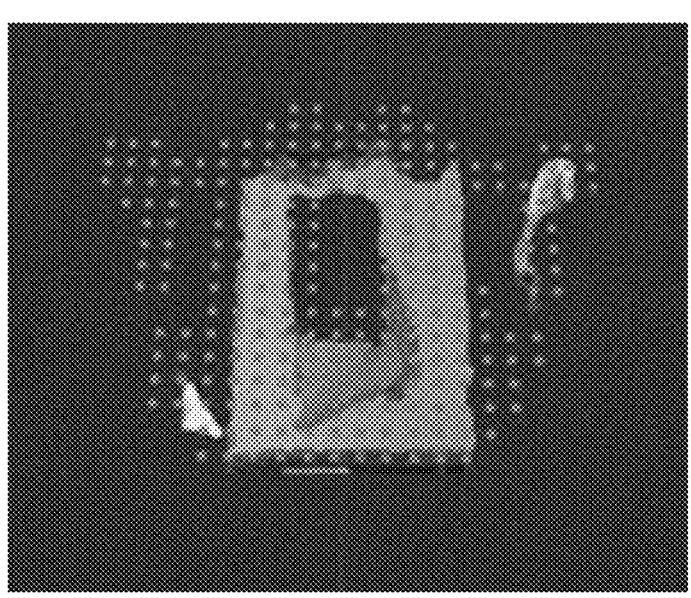

FIG. 19 is a view showing an example of the 3-D depth image captured by the depth camera 120. When the region of interest is extracted from the 3-D depth image, an image as shown in FIG. 20 is generated, and as the described-above comparing process of the projected point cloud and the imaginary point cloud is performed, the point cloud including the voxels formed in the region of the hole may be extracted as shown in FIG. 21. The reversal processing with respect to the voxels is performed, the mobile robot 10 may avoid the hole formed in the bottom surface as an obstacle.

Hereinbelow, a method of operating the mobile robot 10 for detecting the hole formed in the bottom surface of the manufacturing facility 1 may be implemented by the processor 130.

According to the present disclosure, the processor 130 of the mobile robot 10 obtains the 3-D depth image IMG1 from the depth camera 120, extracts, from the 3-D depth image IMG1, the region of interest ROI corresponding to the travelling path of the mobile robot 10 on the bottom surface of the manufacturing facility 1, generates the projected point cloud PC2 by projecting an object detected from the region of interest ROI to the reference plane RP corresponding to the bottom surface, generates the imaginary point cloud PC3 filled with voxels in the reference plane RP, detects the hole hl existing in the bottom surface by comparing the imaginary point cloud PC3 to the projected point cloud PC2, and controls the robot main body 110 so that the robot main body travels while avoiding the hole hl.

According to the embodiment of the present disclosure, within the lower bottom detection range based on the reference height of the 3-D depth image IMG1, the processor 130 may preset the region corresponding to the travelling path of the mobile robot 10 into the region of interest ROI corresponding to the bottom surface of the manufacturing facility 1.

According to the embodiment of the present disclosure, the processor 130 projects the voxels in the region of interest ROI of the 3-D depth image IMG1 to the reference plane RP, and applies the voxel filter X with respect to the projected voxels vx1 and may generate the projected point cloud PC2.

According to the embodiment of the present disclosure, the voxel filter X may be a filter configured to reduce the number of voxels vx1 located in the reference plane RP. The voxel filter X is configured, when the number of voxels located at a unit area ua in the reference plane RP is equal to or greater than the threshold value, to change the voxels located at the unit area ua into one voxel vx2, and when the number located at the unit area ua in the reference plane RP is less than a threshold value, to remove the voxels vx1 of the unit area ua.

According to the embodiment of the present disclosure, the processor 130 may generate the imaginary point cloud PC3 filled with the voxels vx3 in the unit area ua of the voxel filter X of the reference plane RP.

According to the embodiment of the present disclosure, the processor 130 generates the remaining point cloud PC4 by removing the voxels overlapping with the projected point cloud PC2 from the imaginary point cloud PC3, and the region with the voxels of the remaining point cloud PC4 may be detected as the region of the hole from the reference plane RP.

According to the embodiment of the present disclosure, the processor 130 applies reversal with respect to the region with the voxels vx4 of the remaining point cloud PC4 in the reference plane RP to change the voxels in the region of the hole in the 3-D depth image IMG1 into the obstacle object ob_hl, and may preset the moving path so that the mobile robot travels to the target location while avoiding the obstacle object ob_hl.

Figure 22:
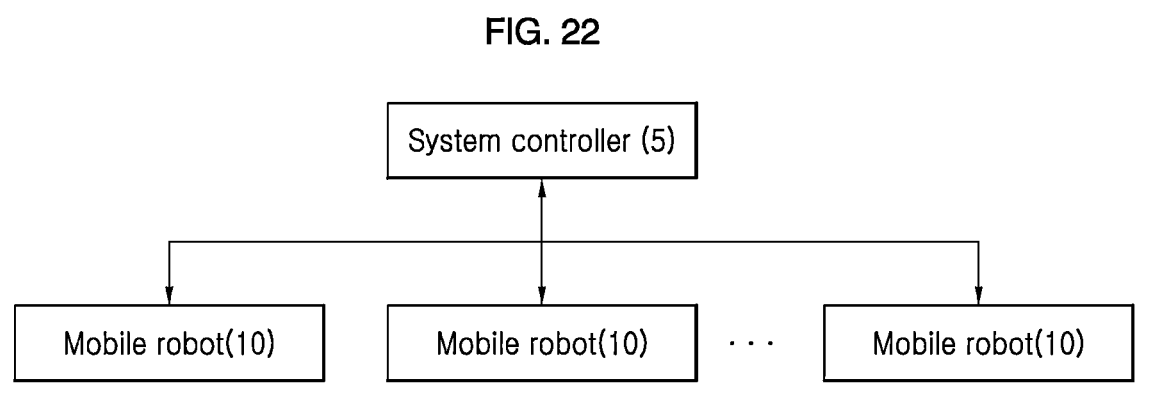

FIG. 22 is a schematic structure of an article transport system according to the present disclosure.

According to the present disclosure, the article transport system in the manufacturing facility 1 includes the system controller 5 transmitting the instruction for transporting the article in the manufacturing facility 1, and the mobile robot 10 for transporting the article according to the instruction.

When the article needs to be transported in the manufacturing facility 1, the system controller 5 generates the instruction for transporting the article, and transmits the instruction the mobile robot 10 available. The system controller 5 may receive the instruction for transport of the article from an upper level control system. The system controller 5 may perform controlling only the mobile robot 10, but also other types of transport apparatus (e.g., OHT, overhead hoist shuttle (OHS), and rail guided vehicle (RGV)). The system controller 5 and the mobile robot 10 may transmit and receive a signal to each other through wireless communication. Although not shown in the drawings, the mobile robot 10 may include a communication module for wireless communication, and the processor 130 may transmit and receive the signal through the communication module.

The mobile robot 10 may be configured to travel according to the instruction transmitted from the system controller 5, and the mobile robot 10 may be configured to avoid an obstacle and a hole located on the moving path.

According to the embodiment of the present disclosure, the mobile robot 10 designates both of a region of interest to detect an obstacle and a region of interest to detect a hole from the captured 3-D depth image, and may perform detections of the obstacle and the hole at the same time (in parallel). Hereinbelow, the mobile robot 10 according to the embodiment will be described.

According to the embodiment of the present disclosure, the mobile robot 10 includes the robot main body 110 travelling the internal space of the manufacturing facility 1, the depth camera 120 installed in the robot main body 110 and generating the 3-D depth image, and the processor 130 controlling travelling of the robot main body 110, detecting an object located on the travelling path of the mobile robot within the upper region of interest of the 3-D depth image, detecting a hole located in the bottom surface of the manufacturing facility within the lower region of interest of the 3-D depth image.

The processor 130 generates an object detected from the lower region of interest to the reference plane RP corresponding to the bottom surface to generate the projected point cloud PC2, generates the imaginary point cloud PC3 filled with voxels in the reference plane RP, compares the imaginary point cloud PC3 to the projected point cloud PC2 to detect the hole hl existing in the bottom surface, and controls the robot main body 110 so that the robot main body 110 travels while avoiding the hole hl.

Figure 23:
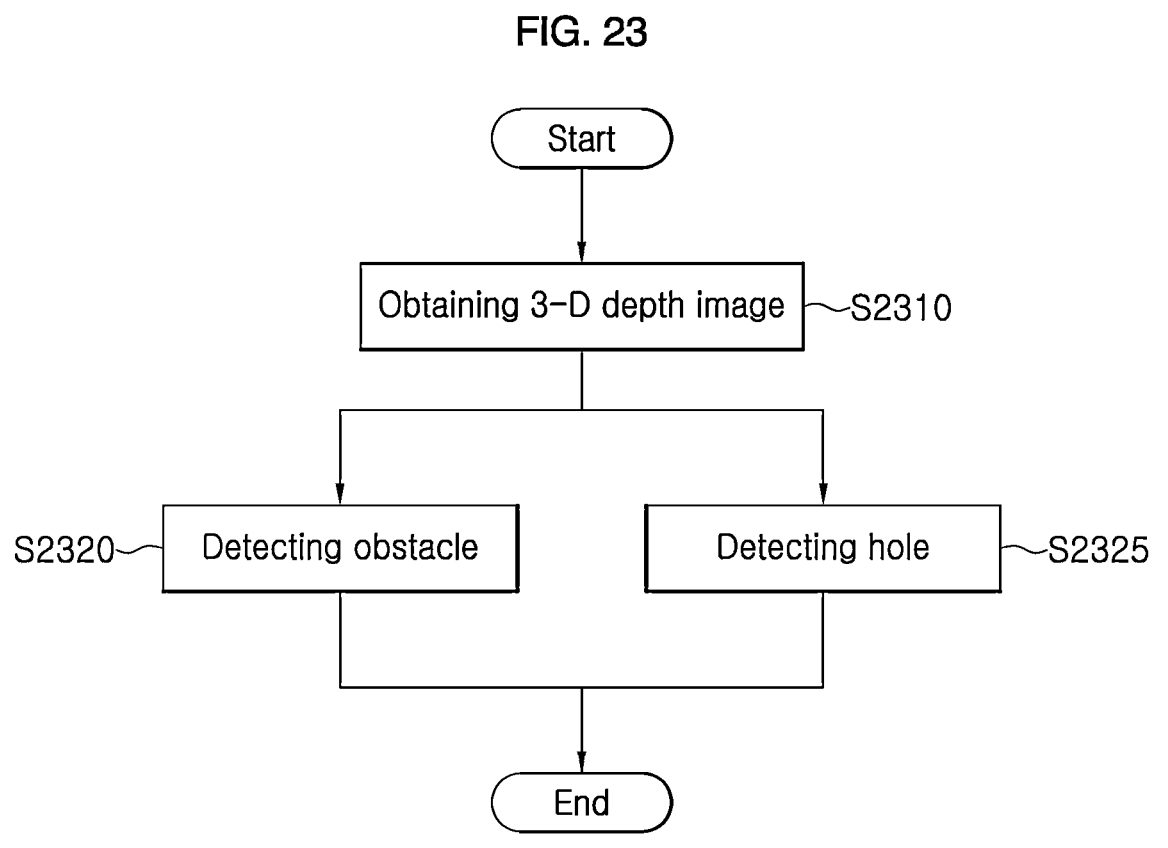

FIG. 23 is a flowchart of a method of operating the mobile robot 10 to detect an obstacle and a hole, in the article transport system according to the present disclosure.

Figure 24:
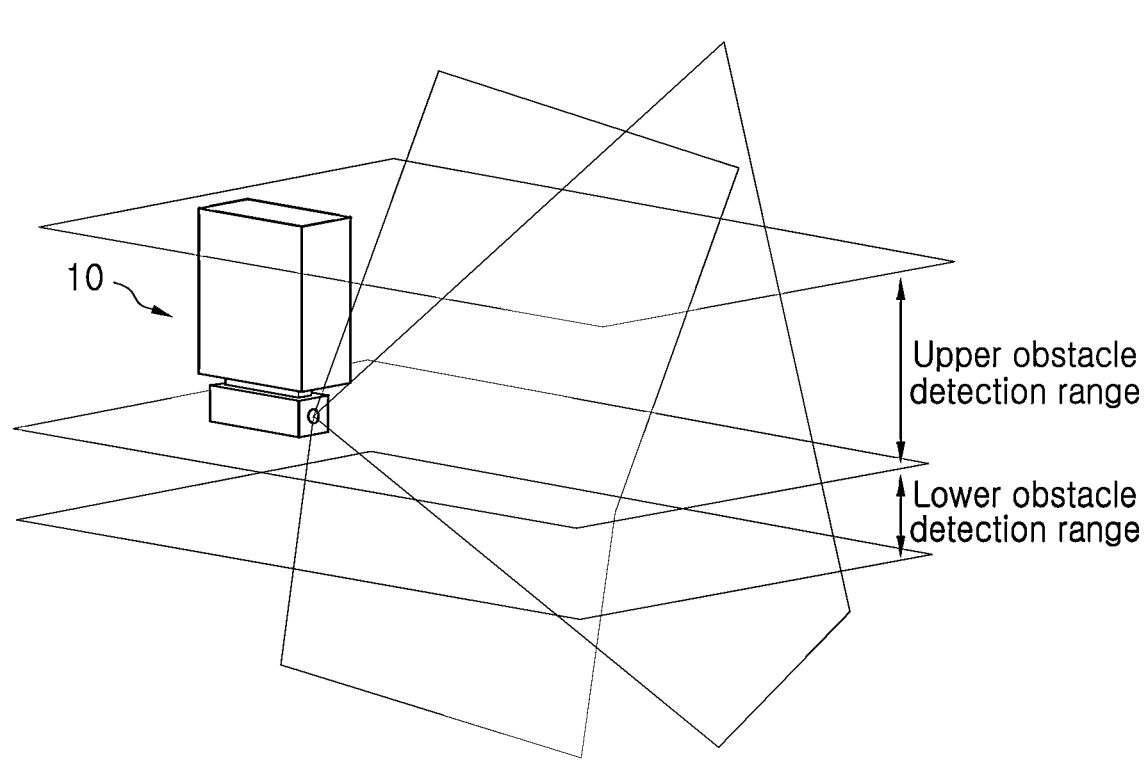
FIG. 24 is a view showing a detection range for detecting the obstacle and the hole.

The mobile robot 10 may obtain the 3-D depth image IMG1 by the depth camera 120 at 52310, detect an obstacle located on the travelling path of the mobile robot 10 from the upper region of interest of the 3-D depth image IMG1 at 52320, and detect the hole located in the bottom surface of the manufacturing facility 1 from the lower region of interest of the 3-D depth image IMG1 at 52325. As shown in FIG. 24, an upper region from the reference height is preset as the upper obstacle detection range, and a lower region from the reference height is preset as the lower bottom detection range. The upper region of interest is preset as a region corresponding to the travelling path of the mobile robot 10 in the upper obstacle detection range, and the lower region of interest may be preset as a region corresponding to the travelling path of the mobile robot 10 in the lower obstacle detection range.

Meanwhile, the locational information of the hole detected by the mobile robot 10 may be shared to the mobile robot, and sharing of the obstacle information can prevent the mobile robot from crashing with the obstacle or falling into the hole. Here, in addition to the locational information of the hole, information about a shape (size and form) of the hole may be shared.

According to the present disclosure, the mobile robot 10 may transmit the locational information of the hole to the system controller 5, and the system controller 5 may store the locational information of the hole and transmit the information to another mobile robot.

Figure 25:
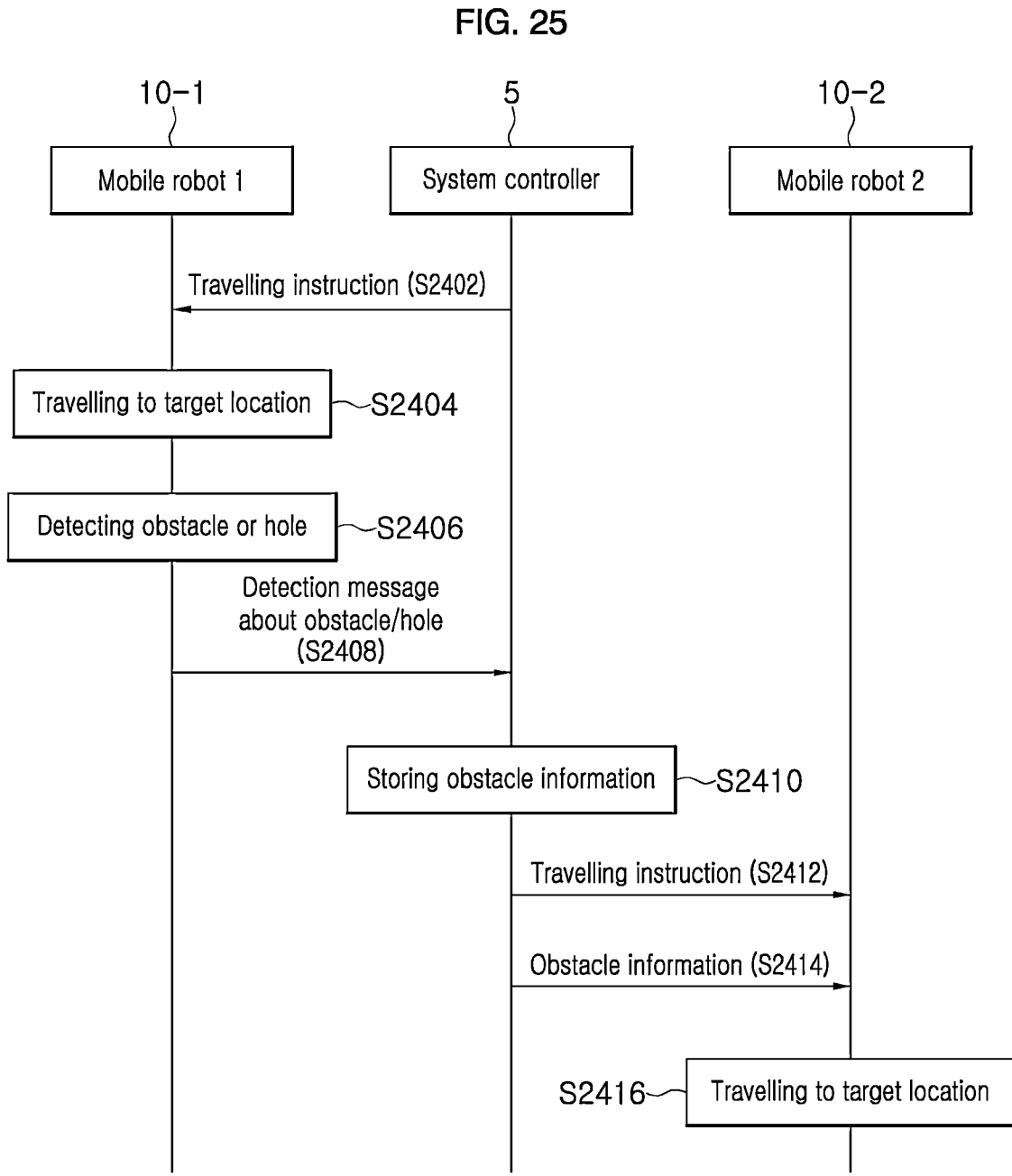
FIG. 25 is a signal flowchart of the article transport system to share location information of the obstacle.

For example, as shown in FIG. 25, the system controller 5 may transmit a travelling instruction to a first mobile robot 10-1 at S2402, and in the travelling at S2404 of the first mobile robot 10-1 to the target location, the system controller 5 may detect the obstacle or the hole at S2406. After travelling while avoiding the obstacle or the hole, the first mobile robot 10-1 may transmit a detection message about the obstacle or the hole to the system controller 5 at S2408. The detection message may include the locational information about the obstacle or the hole, and the information about size and shape of the obstacle or the hole. The system controller 5 may store the information about the obstacle or the hole at S2410, and may share the information to other mobile robots. Specifically, while the system controller 5 may transmit the travelling instruction to a second mobile robot 10-2 expected to travel along a similar path around the obstacle or the hole at S2412, the system controller 5 may transmit the information of the obstacle or the hole at S2414 thereto. The second mobile robot 10-2 may travel to a target location while considering the information (location and shape) of the obstacle or the hole at S2416. For example, when the second mobile robot 10-2 is located around the obstacle or the hole, the second mobile robot 10-2 at a relatively low speed, and when the obstacle or the hole is not detected, the second mobile robot 10-2 may transmit a message of removal of the obstacle or the hole to the system controller 5.

Although the embodiments of the present disclosure have been disclosed for illustrative purposes, those skilled in the art will appreciate that various modifications, additions and substitutions are possible, without departing from the scope and spirit of the invention as disclosed in the accompanying claims. Since the present disclosure may be embodied in other specific forms without changing the technical sprit or essential features, those skilled in the art to which the present disclosure belongs should understand that the embodiments described above are exemplary and not intended to limit the present disclosure.

The scope of the present disclosure will be defined by the accompanying claims rather than by the detailed description, and those skilled in the art should understand that various modifications, additions and substitutions derived from the meaning and scope of the present disclosure and the equivalent concept thereof are included in the scope of the present disclosure.

What is claimed is:

1. A method of operating a mobile robot for transporting an article in a manufacturing facility, the method comprising:

obtaining a three dimensional (3-D) depth image from a depth camera;

extracting, from the 3-D depth image, a region of interest corresponding to a traveling path of the mobile robot on a bottom surface of the manufacturing facility;

generating a projected point cloud by projecting an object detected from the region of interest on a reference plane corresponding to the bottom surface;

generating an imaginary point cloud representing an artificial uninterrupted bottom surface filled with voxels in the reference plane, wherein the imaginary point cloud is independent from the 3-D depth image obtained from the depth camera;

detecting a hole existing in the bottom surface by comparing the imaginary point cloud to the projected point cloud; and travelling while avoiding the hole, wherein the generating of the projected point cloud comprises:

projecting voxels in the region of interest of the 3-D depth image on the reference plane; and applying a voxel filter with respect to the projected voxels to generate the projected point cloud, wherein the applying of the voxel filter includes reducing a number of the voxels located in the reference plane, wherein when a number of voxels located in a unit area in the reference plane is equal to or greater than a threshold value, the voxel filter changes the voxels located in the unit area into one voxel, wherein when the number of the voxels located in the unit area in the reference plane is less than the threshold value, the voxel filter removes the voxels in the unit area, wherein the generating of the imaginary point cloud comprises generating the imaginary point cloud filled with first imaginary voxels in the unit area of the voxel filter in the reference plane, wherein the detecting of the hole existing in the bottom surface comprises:

generating a remaining point cloud including second imaginary voxels by removing overlapping voxels of the projected point cloud from the first imaginary voxels of the imaginary point cloud; and detecting, from the reference plane, a region with the second imaginary voxels of the remaining point cloud as a region of the hole, and wherein the traveling while avoiding the hole comprises:

changing the second imaginary voxels in the region of the hole into an obstacle object in the 3-D depth image by applying reversal with respect to the region with the second imaginary voxels of the remaining point cloud in the reference plane; and presetting a moving path so that the mobile robot travels to a target location while avoiding the obstacle object.

2. The method of claim 1, wherein the extracting of the region of interest comprises presetting a region corresponding to the traveling path of the mobile robot within a lower bottom detection range based on a reference height in the 3-D depth image, into the region of interest.

3. A mobile robot for transporting an article in a manufacturing facility, the mobile robot comprises:

a robot main body travelling in an internal space of the manufacturing facility;

a depth camera provided in the robot main body; and a processor configured to control travelling of the robot main body, wherein the processor is configured to:

obtain a 3-D depth image from the depth camera, extract a region of interest, which corresponds to a travelling path of the mobile robot on a bottom surface of the manufacturing facility, from the 3-D depth image, generate a projected point cloud by projecting an object detected from the region of interest on a reference plane corresponding to the bottom surface, generate an imaginary point cloud representing an artificial uninterrupted bottom surface filled with voxels in the reference plane, wherein the imaginary point cloud is independent from the 3-D depth image obtained from the depth camera, detect a hole existing on the bottom surface by comparing the imaginary point cloud to the projected point cloud, and

control the robot main body so that the robot main body
travels while avoiding the hole, and wherein the processor is further configured to:

project voxels in the region of interest of the 3-D depth
image on the reference plane;

generate the projected point cloud by applying a voxel
filter with respect to the projected voxels, wherein the
voxel filter is a filter configured to reduce a number of
the voxels located in the reference plane, wherein when
the number of voxels located in a unit area in the
reference plane is equal to or greater than a threshold
value, the voxel filter changes the voxels located in the
unit area into one voxel, and when the number of the
voxels located in the unit area in the reference plane is
less than the threshold value, the voxel filter removes
the voxels in the unit area;

generate the imaginary point cloud filled with a first
imaginary voxels in the unit area of the voxel filter of
the reference plane;

generate a remaining point cloud including second imagi-
nary voxels by removing overlapping voxels of the
projected point cloud from the first imaginary voxels
the imaginary point cloud;

detect, from the reference plane, a region with the second
imaginary voxels of the remaining point cloud as a
region of the hole;

change the second imaginary voxels of the region of the
hole into an obstacle object in the 3-D depth image by
applying reversal with respect to the region with the
second imaginary voxels of the remaining point cloud
in the reference plane; and preset a moving path of the robot main body so that the
robot main body travels to a target location while
avoiding the obstacle object.

4. The mobile robot for claim 3, wherein the processor is
further configured to preset a region corresponding to the
travelling path of the mobile robot in a lower bottom
detection range of a reference height in the 3-D depth image,
into the region of interest.

5. An article transport system in a manufacturing facility,
the article transport system comprising:

a system controller configured to transmit an instruction
for transporting an article in the manufacturing facility;
and a mobile robot configured to transport the article accord-
ing to the instruction, wherein the mobile robot comprises:

a robot main body travelling in an internal space of the
manufacturing facility;

a depth camera provided in the robot main body and
configured to generate a 3-D depth image; and a processor configured to control travelling of the robot
main body, to detect an obstacle located on a travelling
path of the mobile robot from an upper region of
interest of the 3-D depth image, and to detect a hole located on a bottom surface of the manufacturing
facility from a lower region of interest of the 3-D depth
image, wherein the processor is configured to:

generate a projected point cloud by projecting an object
detected from the lower region of interest to a reference
plane corresponding to the bottom surface, generate an imaginary point cloud representing an artifi-
cial uninterrupted bottom surface filled with voxels in
the reference plane, wherein the imaginary point cloud
is independent from the 3-D depth image obtained from
the depth camera, detect the hole existing on the bottom surface by com-
paring the imaginary point cloud and the projected
point cloud, and control the robot main body so that the robot main body
travels while avoiding the hole, and wherein the processor is further configured to:

project voxels of the lower region of interest of the 3-D
depth image, on the reference plane;

generate the projected point cloud by applying a voxel
filter with respect to the projected voxels, wherein the
voxel filter is a filter configured to reduce the number
of voxels located in the reference plane, wherein when
a number of the voxels located in a unit area in the
reference plane is equal to or greater than a threshold
value, the voxel filter changes the voxels located in the
unit area into one voxel, and when the number of the
voxels located in the unit area in the reference plane is
less than the threshold value, the voxel filter removes
the voxels in the unit area;

generate the imaginary point cloud filled with a first
imaginary voxels in the unit area of the voxel filter of
the reference plane;

generate a remaining point cloud including second imagi-
nary voxels by removing overlapping voxels of the
projected point cloud, from the first imaginary voxels
of the imaginary point cloud;

detect, from the reference plane, a region with the second
imaginary voxels of the remaining point cloud as a
region of the hole;

change the second imaginary voxels of the region of the
hole into an obstacle object in the 3-D depth image by
applying reversal with respect to the region with the
voxels of the remaining point cloud in the reference
plane; and preset a moving path of the robot main body so that the
robot main body travels to a target location while
avoiding the obstacle object.

6. The article transport system of claim 5, wherein the mobile robot is configured to transmit loca-
tion information of the hole to the system controller,
and wherein the system controller is configured to store the
location information of the hole and transmit the loca-
tion information of the hole to another mobile robot.

* * * * *